United States Patent [19]

Carr

[11] Patent Number: 4,707,286

[45] Date of Patent: Nov. 17, 1987

[54] COOLANT STABILIZER

[75] Inventor: Richard P. Carr, Naperville, Ill.

[73] Assignee: Nalco Chemical Company, Oak Brook, Ill.

[21] Appl. No.: 808,997

[22] Filed: Dec. 16, 1985

[51] Int. Cl.$^4$ ............................................... C09K 5/00
[52] U.S. Cl. ..................................... 252/75; 252/78.3; 252/78.5; 252/180; 252/181; 556/405
[58] Field of Search ..................... 252/75, 78.3, 78.5, 252/180, 181; 556/405

[56] References Cited

U.S. PATENT DOCUMENTS

| | | | |
|---|---|---|---|
| 2,349,338 | 5/1944 | Clapsadle et al. | 252/78.3 |
| 3,303,139 | 2/1967 | Blaser et al. | 252/180 |
| 3,723,333 | 3/1973 | Freyhold | 252/180 |
| 3,960,576 | 6/1976 | Carter et al. | 252/181 |
| 4,209,398 | 6/1980 | Ii et al. | 252/181 |
| 4,320,023 | 3/1982 | White | 252/75 |
| 4,370,255 | 1/1983 | Plueddemann | 252/78.3 |
| 4,460,478 | 7/1984 | Mohr et al. | 252/78.3 |
| 4,466,896 | 8/1984 | Darden | 252/78.3 |

Primary Examiner—Robert A. Wax
Attorney, Agent, or Firm—John G. Premo; Joan I. Norek; Donald G. Epple

[57] ABSTRACT

A stabilizer for glycol or glycol ether based aqueous coolant compositions comprising a combination of certain organic phosphonate compounds and certain organic silicon compounds, and coolant compositions containing such a stabilizer and methods of stabilizing coolant compositions by the addition of such stabilizer.

13 Claims, No Drawings

COOLANT STABILIZER

TECHNICAL FIELD OF THE INVENTION

The present invention is in the technical field coolant formulations and additives therefor for internal combustion engines, and more particularly the technical field of stabilizers for such coolants and additives to prevent gels or precipitates from depositing out of such formulations, particularly during use.

BACKGROUND OF THE INVENTION

In coolants (antifreeze) formulations for internal combustion engines, including glycol-type coolants, alkali metal silicates are often added for corrosion inhibition. Silicates are believed to inhibit corrosion by forming a thin protective layer over metal surfaces of the coolant system. Such alkali metal silicates (generally the commercially feasible sodium or potassium silicates) are the best known protection against corrosion of aluminum cooling system and engine components.

The use of aluminum parts in the automotive field has increased in recent years. Aluminum radiators are found in many newer-model passenger cars. Many imported medium-duty engines contain several aluminum parts. Some aluminum cooling system components have been incorporated into some new heavy-duty engines. The use of aluminum parts is expected to further increase in the future because of aluminum's machinery and weight savings costs.

Responsive to such increasing use of aluminum, manufacturers of coolants for internal combustion engines have generally increased the silicate content therein. Silicate levels in many commercial coolants have increased about three- to eight-fold in the past several years. A typical undiluted coolant contains about 1400 ppm silicate as $SiO_2$. For most parts of the United States the recommended dilution of coolant concentrate is 50:50 with water, but this drops to about 60:40 coolant to water in areas that experience severe cold conditions, such as in the North and Northwest areas of North America. Coolant additives or conditioners may themselves contain silicate and thus increase the overall silicate level of the coolant during use.

The level of silicate in a given cooling system may be higher than comtemplated by coolant and additive manufacturers, for instance if a mechanic tops-off the coolant in the system with straight concentrate instead of diluting it with water, or when additives or conditioners are added in amounts greater than recommended dosages.

There have been an increasing number of instances of deposits dropping out of coolants, which problem is believed in part attributable to the high silicate levels in the coolant, possibly aggravated by high engine temperatures used for increased fuel burning efficiency, the presence of phosphate corrosion inhibitors and calcium and magnesium ions of hard water, the heat-cool cycles of diesel engines, and low-flow cooling systems with smaller-diameter radiator tubes. Such deposition problems, discussed in more detail below, can reduce the efficiency of the cooling system leading to engine overheating, and can cause damage to the water pump and other progressive engine damage. Once formed such deposits, gels often containing abrasive particles, are extremely difficult to eliminate from the cooling system.

While glycol-based low-silicate coolants are still to be found commercially, they are not widely available because unsuitable for many engines, they are often more expensive, and their use may not be wholly preventive of coolant deposits. Deposit drop-out can also be a problem under some conditions with coolants containing no silicates, for instance coolants containing high levels of phosphates.

It is thus highly desirable to provide a composition that stabilizes such coolants, preventing the fall out of gelled deposits in the first instance. It is highly desirable to provide such a stabilizer that is effective in the presence of phosphates and calcium and magnesium ions and other aspects of the chemical environment under us conditions. It is desirable that such stabilizer be effective with both low and high silicate coolants and regardless of whether additives or conditioners are incorporated into the coolant at recommended or higher than recommended dosages. It is desirable that such stabilizer be effective while not interfering with the corrosion inhibition system of the coolant.

U.S. Pat. No. 3,288,846 (Irani et al.) describes processes for manufacturing aminoalkylenephosphonic acids and notes that the relatively lower molecular weight ones are useful as water softening agents in boiling water, for example, to prevent iron precipitation. U.S. Pat. No. 3,303,139 (Blaser et al.) discloses aminophosphonic acid metal ion complex formers particularly for polyvalent metal ions and methods for preparing such compounds. U.S. Pat. No. 3,483,925 (Slyker) discloses a method of treating oil wells to inhibit the deposition of scale comprising the use of a viscous polymer solution and a solution of scale inhibitor; the scale inhibitor is preferably an organic phosphonate. U.S. Pat. No. 3,630,938 (Troscinski) discloses scale formation inhibition and corrosion prevention in water or brine with the combination of certain chromate compounds and organic phosphonate compounds. U.S. Pat. No. 3,723,333 (Freyhold) discloses substituted alkylene diphosphonic acids/salts together with water-soluble, complex-forming compounds containing at least one phosphonate or N-dimethylenephosphonic acid group for the prevention of corrosion and mineral depositions. U.S. Pat. No. 3,886,204 (Geffers et al.) discloses phosphonoalkyldicarboxylic acids having complex-forming effect on alkaline earth metal ions. U.S. Pat. No. 3,960,576 (Carter et al.) discloses the use of inorganic silicate-based compositions together with an organic phosphonate and carboxy methyl cellulose for corrosion inhibition. U.S. Pat. No. 4,026,815 (Kallfass et al.) discloses inhibition of corrosion and scale formation with phosphonocarboxylic acids.

U.S. Pat. No. 4,287,077 (Wing) discloses the addition of a glycol soluble ether-modified silicone to aqueous glycol and glycol ether compositions containing silicates and other corrosion inhibitors to prevent silicate gelling during storage. U.S. Pat. No. 4,333,843 (Wing et al.) discloses organophosphorussilicon hydrolyzates for preventing gelation during storage of aqueous glycol and glycol ether compositions. U.S. Pat. No. 4,367,154 (Jernigan) discloses the use of organo-silicon phosphonates for rendering glycol concentrates containing alkali metal silicates gelation resistant; such compounds contain trialkoxy - silyl, alkyldialkoxy - silyl, or dialkylalkoxy - silyl groups. U.S. Pat. No. 4,457,852 (Bosen) discloses organomercaptosilanes having a reactive group causing the mercaptosilane to form a silanol when hydrolyzed for improving the anti-gel characteristics of silicate-containing antifreeze compositions.

U.S. Pat. No. 4,462,921 (Peterson et al.) and U.S. Pat, No. 4,466,896 disclose organosiloxane stabilizers for silicate-containing antifreeze/coolant compositions.

DISCLOSURE OF THE INVENTION

For coolants, the present invention provides a stabilizer for coolaht compositions comprising, in combination:

(A) an organic phosphonate compound of the general formula I

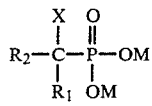

wherein X is H, amine, hydroxy, alkyl of 1 to 5 carbons, or aryl; $R_1$ is hydrogen, hydroxy, alkyl of 1 to 5 carbons, aryl, or a radical of the formula

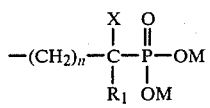

wherein n is an integer from 0 to 8; $R_2$ is hydrogen, alkyl of 1 to 5 carbons, aryl, or a radical of one of the formulas

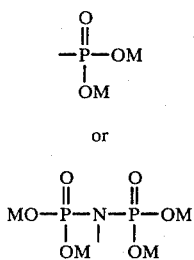

wherein any of said alkyl or aryl may be independently substituted with hydroxy, amine, halide, or alkoxy of 1 to 3 carbons; and wherein M is hydrogen or a water-soluble cation such as sodium, potassium, ammonium, and the like;

or an organic phosphonate compound of the general formula II

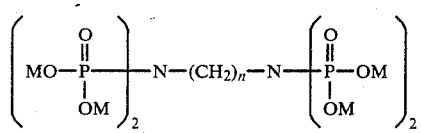

wherein n is an integer from 1 to 6 and M is as defined above;

or an organic phosphonate compound of the general formula III

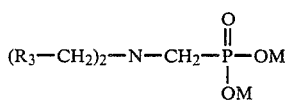

wherein M is as defined above and $R_3$ is a radical of one of the formulas

or

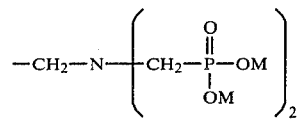

wherein M is as defined above; and (B) an organic silicon compound of the general formula IV

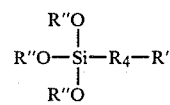

wherein $R_4$ is alkyl of 1 to 8 carbons, R' is a water-solubilizing group, and R'' is hydroqen, alkyl of 1 to 3 carbons, or a water-soluble cation such as sodium, potassium, ammonium, and the like, and wherein $R_4$ may be substituted with hydroxy, amine, halide or alkoxy of 1 to 3 carbons The present invention provides an aqueous coolant formulation containing from about 40 to about 70 weight percent of glycol or glycol ether composition, silicate and/or phosphate corrosion inhibitor, and a stabilizer comprising in combination an organic phosphonate compound of the general formulas I–III and an organic silicon compound of the general formula IV above, wherein the organic phosphonate is present in an amount of from 30 to 200 ppm based on total aqueous coolant and the organic silicon compound is present in an amount of from 250 to 2000 ppm based on total aqueous coolant.

The present invention further provides a method for stabilizing a glycol or glycol ether based aqueous coolant composition comprising adding to an aqueous coolant formulation containing from about 40 to about 70 weight percent of glycol or glycol ether composition an organic phosphonate compound of the general formulas I–III in an amount of from 30 to 200 ppm based on total aqueous coolant and an organic silicon compound of the general formula IV above in an amount of from 250 to 2000 ppm based on total aqueous coolant. The present invention also provides a method for stabilizing an aqueous coolant formulation comprising adding to a glycol or glycol ether coolant concentrate an organic phosphonate compound of the general formulas I to III in an amount of 20 to 500 ppm based on total concentrate and an organic silicon compound of the general formula IV above in an amount of from 175 to 5000 ppm based on total concentrate.

In preferred embodiment such coolant and coolant concentrate contain silicate as a corrosion inhibitor but the present invention is not so limited. The problems experienced from which are derived a serious need for a stabilizer such as the stabilizer of the present invention are believed primarily related to the presence of inorganic silicate in coolant formulations as mentioned briefly above, but as discussed in greater detail below, the causes of coolant drop-out under use conditions are complex and may not yet be fully understood. Although coolants using phosphate corrosion inhibitors to the exclusion of silicate are believed much less likely to encounter a drop-out problem, it is believed the present invention will be effective to prevent such problem to the extent it exists. Other preferred embodiments are discussed below.

PREFERRED EMBODIMENTS OF THE INVENTION

The primary mechanism which leads to silicate falling out of a coolant is believed to be a catalytic polymerization of the silicate molecules. The high engine heat promotes the combination of silicate molecules, forming larger particles that precipitate in the form of an abrasive gel on cooler surfaces. This process is not reversible. Since this polymerization is accelerated by heat, today's hotter running engines may be the reason silicate-gel drop out has become an increasing problem lately. Some in the field believe that silicate-gel drop out will not occur with high grade coolants in the absence of abusive over-concentration of silicate in use regardless of the engine type, but, as shown in the Examples below, gel deposits nonetheless occur when coolants are put through temperature cycles from engine operating temperatures to ambient room temperatures, and under other typical use conditions.

One of the secondary mechanisms of silicate gel deposition is believed related to the presence of calcium and/or magnesium ions which can be introduced into the coolant by the use of tap water for dilution purposes. These ions can react with coolant silicates and phosphates. (Phosphate is used in coolants to protect ferrous metals such as iron.) The deposition problem is not believed limited to calcium phosphate, calcium silicate and magnesium silicate precipitation. Nonetheless the use of hard water, particularly tap water of significant hardness, has been found to increase gel deposits in coolant compositions when the stabilizer of the present invention is not used.

Other possible mechanisms include reaction of silicate with soluble corrosion products such as ions of iron, copper, lead and aluminum, to form insoluble complexes, and excessive plating of silicates onto cooling system components.

These secondary mechanisms are believed to become significantly operative when low silicate coolants are used. As mentioned above, low-silicate coolants are not immune to silicate drop out, particularly in hot running engines. Moreover, such low-silicate coolants are believed not sufficiently protective for at least some late-model engines, and as aluminum is used more extensively in the future low-silicate coolants may be rendered wholly unsuitable commercially, not affording the corrosion protection required.

Supplemental coolant additives may contain supplemental corrosion inhibitor blends, including silicate. These additives are extensively used with heavy-duty engines, even in fresh coolants because cast iron parts require additional protection from corrosion cavitation, and frequently used with in passenger automobiles, at least to refresh the coolant. A single recommended dose of a supplemental additive can increase the silicate level in a diluted coolant from about 700 ppm to about 900 to 1200 ppm silicate as $SiO_2$. Such additives may also add phosphates to the coolant. Hence indiscriminant use of such additives without adequate stabilization of gel-forming substances can also be considered an aggravating factor.

Silicate drops out of coolants as a gel-like substance which can clog radiators, heater cores, aftercoolers and oil coolers along with other coolant passages of truck and other vehicle cooling systems.

When the silica-gel drops out of solution onto heat transfer surfaces, coolant flow is reduced and engines can overheat. Abrasive particles in the silica-gel can collect on water pump seal surfaces, abrading the seal face and forcing apart the two seal faces, causing pump leakage. No heat from the heater, high oil and water temperatures, and water pump failure are just some of the possible side effects of plugged radiators. It is believed that such gel deposit can lead to complete engine failure. This deposition is often concentrated in the low-flow portions of the cooling system where coolant temperatures are cooler. Low-flow cooling systems are found in many modern heavy-duty engines, and are believed to be another contributing factor to the gel formation problem. Low-flow cooling systems have tubes of smaller diameters than traditional radiators and thus these tubes are more likely to plug. In addition, such type of radiator is more vulnerable because of its cooler surfaces.

In addition to hotter running engines, diesel engines have a heat-and-cool cycle that can contribute to the gel drop out problem. Moreover diesels that depend on water-cooled aftercoolers are in jeopardy because the gel can quickly restrict or clog small passages of these aftercoolers.

The silicate gel can be completely removed by agitation of the components in a hot solution of caustic or alkaline EDTA (ethylenediamine tetraacetic acid) or the like, but such cleaning can damage O-rings, gaskets, seals and softer metals such as aluminum and solder, and thus such solutions should not be run through an engine. Some smaller components can be removed for cleaning, but it is impractical to dissassemble the engine to clean all affected components. Thus prevention of this gel in the first instance is of extreme importance.

This coolant gel is a gelatinous substance in its wet form and a powder or scale when dry. The gel is often gritty in texture, and such grittiness is believed the substance that is abrasive to cooling system components.

Silicate-stabilization under actual use conditions is far more complex than stabilization of the coolant under storage conditions. In storage, the coolant is held in an essentially closed environment with little potential for the introduction of new chemical species, or extreme temperature changes, while a working coolant is exposed to a progressive array of environmental changes. As discussed above, hard water salts, corrosion products, and coolant active ingredients, at today's high engine operating temperates, can all combine to form an abrasive gel, which condition can be aggravated by low-flow cooling systems, diesel aftercoolers and the like. It is not surprising then that many compositions reported or found effective for storage stability were not effective in coolant compositions under similated use conditions.

The glycols and glycol ethers that can be used in coolants include ethylene glycol, diethylene glycol, propylene glycol, dipropylene glycol, the methyl, ethyl, propyl or butyl ether of such glycols, and the methyl and ethyl diethers of ethylene glycol, diethylene glycol, or dipropylene glycol. Ethylene glycol is the most commonly used of these in commercial coolants.

The alkali metal silicates that can be used in such coolants include sodium metasilicate, potassium metasilicate, lithium metasilicate and the like. In addition to such silicates other corrosion inhibitors and additives are found in coolants, including without limitation alkali metal borates, alkali metal mercaptobenzothiazoles and tolyltriazoles, alkali metal nitrates, and alkali metal phosphates. The coolant can also contain aminopolycarboxylic acids, alpha-hydroxy acids, oil-in-water emulsifiers, and a vast array of other additives and conditioners.

In addition to the above additives and corrosion inhibitors, which may be contained in the glycol concentrate from which the use-coolant is prepared or added by way of supplemental inhibitor or conditioner, a commercial coolant may contain itself, before the addition of the stabilizer of the present invention, various coolant stabilizers.

One of the two components of the stabilizer of the present invention, the organic phosphonate of the general formula I described above is preferably a di or triphosphonated compound wherein $R_2$ is

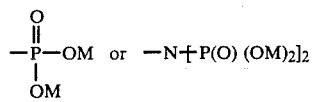

and M is as defined above. In practice it has been found, for instance, that certain compounds within this preferred class are extremely effective as components of the stabilizer of the present invention, for instance the diphosphonated compound 1-hydroxyethylidene 1,1 - diphosphonic acid and its salts with water-soluble cations such as sodium, potassium, ammonium and the like. Such compound is also known as hydroxyethylidene diphosphonic acid, hydroxyethane diphosphonic acid, or the designation HEDP, and is commercially available as a 60% solution under the tradename Dequest 2010, from Monsanto Company.

Another compound of this preferred class is the triphosphonated amino compound, aminotri(methylenephosphonate) also known as ATMP and AMP, and available commercially under the tradename Dequest 2000. It is noted that amines are considered generally as corrosive, particularly to copper and brass, and thus not in all instances will such amino compound or other compounds within the present invention containing amino and substituted amino moieties be suitable for given applications at given use levels. However, given the present invention and the disclosures herein, it should be within the skill of one of ordinary skill in the art to select appropriate stabilizer components and combinations thereof and use levels for a given application.

In preferred embodiment, the organic silicon compound of the general formula IV described above is in which R' is solubilizing such as

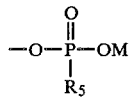

wherein M is as defined above for formula I, i.e., hydrogen or a water-soluble cation such as sodium, potassium, ammonium, and the like, and $R_5$ is OM or alkyl of 1 to 3 carbons. In further oreferred embodiment, R' is such phosphonate ester radical and $R_4$ an alkyl of 2 to 4 carbons, and more preferably an alkyl of the formula $(CH_2)n$ wherein n is an integer from 2 to 4. and R'' is a water-soluble cation.

In practice, for instance, it has been found that a commercial phosphonate ester alkyl silicon compound within the above preferred class of compounds, sold under the tradename of Q1-6083 by Dow Corning Corporation, is extremely effective as an organic silicon compound component of the stabilizer of the present invention.

Another preferred organic silicon compound for the stabilizer is one in which the R' solubilizing group is a substituted amine such as a radical of the formula

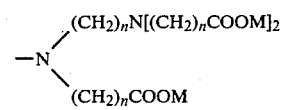

wherein n is an integer from 1 to 4 and M is hydrogen or a water-soluble cation such as sodium, potassium, ammonium, and the like. In further preferred embodiment, R' is such a polycarboxylic-substituted alkylamine radical and $R_4$ of formula IV is an alkyl of 2 to 4 carbons, and more preferably an alkyl of the formula $(CH_2)_n$ wherein n is an integer from 2 to 4, and R'' is a water-soluble cation.

Other examples of the organic phosphonate component of the stabilizer of the present invention include 1-aminoethane-1,1-diphosphonic acid, 1-aminopropane-1,1-diphosphonic acid, 1-aminobenzyl-1,1 - diphosphonic acid, 1-hydroxypropane-1,1-diphosphonic acid, 1-hydroxybenzyl-1,1-diphosphonic acid, hydroxybutane diphosphonic acid, hydroxypentane diphosphonic acid, and water soluble salts thereof. Other examples include ethylenediaminotetra(methylenephosphonic acid), diethylenetriaminopenta(methylenephosphonic acid), and water soluble salts thereof.

If the additive is to be formulated as a supplemental additive apart from coolant concentrate or other supplemental additive, it may be combined as an aqueous solution, preferable using soft water as the diluent, and preferably caustic should be added to make alkaline.

The term "coolant" is being used herein generally instead of the term "antifreeze". Coolants are not only antifreeze compositions, but also anti-corrosion and anti-boiling compositions as now marketed commercially.

Methods of preparing the compositions comprising components of the stabilizer are described in the above-cited prior art patents.

EXAMPLES 1 TO 4

In Examples 1 to 4 the effectiveness of the stabilizer of the present invention to prevent drop-out from commercial coolants heated to engine operating temperature was demonstrated. In each sample a commercial coolant was diluted by mixing 50 ml. of the coolant concentrate with 50 ml. of 20-gpg water. For each Example, two samples of each coolant were put through a double heat/cool cycle (described below), one sample containing the stabilizer of the present invention, the other without it.

For each heat/cool cycle, the sample is heated with agitation to 80° C. and then allowed to cool to ambient room temperature, again with agitation. The cycle is then repeated in the same manner. After the two cycles, the sample is stored for several hours to permit settling, and then the amount of drop-out or precipitation is estimated by its volume. This test procedure was found to be reproducible.

In all of these Examples the stabilizer used was a combination of hydroxyethylidene diphosphonate (Dequest 2010) and Q1-6083, a phosphonate ester alkyl silicon compound, added respectively in the amounts of 120 ppm and 1000 ppm actives based on total coolant.

For these Examples 1 to 4 and subsequent examples using this test, the relative amounts of drop-out were expressed as one of the following: none, very slight, slight, medium, heavy or very heavy, Each of the coolants used was a high-quality commercial coolant. Three of these, designated "A", "B", and "C" here and in subsequent examples, were automotive grade ethylene glycol-based coolants containing about 1400 ppm silicate as $SiO_2$. A fourth, designated "D", was again ethylene glycol based but contained a lower amount of silicate, i.e., about one-half the level of the others.

The results for each of the Examples are set out in Table I below.

TABLE I

| Example No. | Coolant | Drop-out Without Stabilizer | Drop-out With Stabilizer |
|---|---|---|---|
| 1 | A | medium | none |
| 2 | B | slight | none |
| 3 | C | medium | none |
| 4 | D | medium | none |

EXAMPLES 5 TO 17

In Examples 5 to 16 the effectiveness of the stabilizer of the present invention to prevent silicate drop-out from commercial coolants to which a silicate-containing supplemental additive has been added was demonstrated. Diluted commercial coolant compositions were prepared as described in Examples 1 to 4 above, and to each sample was added a certain amount of Nalcool 2000, a commercial supplemental conditioner containing silicate from Nalco Chemical Company. The typical dose of this additive is about 3 volume percent; hence this additive was added at either 3 ml. per 100 ml. of coolant or multiples thereof. The stabilizer was added as described in Examples 1 to 4 and the compositions tested by the double heat-cool cycle method also described above for Examples 1 to 4. The results for each is set out below in Table II. The stabilizer was used in each of Examples 5 to 17 in the same form and same level as described for Examples 1 to 4.

TABLE II

| Example No. | Coolant | Amt. Nalcool 2000 (ml./100 ml. coolant) | Drop-out |
|---|---|---|---|
| 5 | A | 3 | none |
| 6 | A | 6 | very slight |
| 7 | A | 9 | slight |
| 8 | B | 3 | very slight |
| 9 | B | 6 | very slight |
| 10 | B | 9 | very slight |
| 11 | C | 3 | none |
| 12 | C | 6 | none |
| 13 | C | 9 | none |
| 14 | C | 12 | none |
| 15 | D | 3 | none |
| 16 | D | 6 | none |
| 17 | D | 9 | none |

EXAMPLE 18

The effectiveness of the stabilizer of the present invention was demonstrated further in a "recirculating test rig" unit consisting of a heat transfer tube of approximately 30,000 $BTU/ft^2/hour$, a flow meter to provide a flow rate of approximately 10 to 12 feet per second past the heat transfer surface, and a coolant vessel with a cone-shaped bottom. The coolant vessel is equipped with a thermoregulator for cooling water which permits operation at temperatures from ambient to 250° F. The unit is designed to operate under pressures up to 80 P.S.I. and is equipped with a thermocouple and temperature controller for automatic heat shut-off over 260° F. This recirculating test rig simulates a typical automotive cooling system. It is designed to duplicate conditions of flow and heat transfer of an engine cooling system.

In operation, the coolant is pumped through the flow meter, past the heat transfer tube, and then into the coolant vessel wherein it comes in contact with the thermocouple and temperature controller. From the coolant vessel it is returned to the pump.

Approximately 10 liters of coolant are used in these tests which are run one day or more at a temperature of 190° F.

A coolant composition was first prepared using the commercial coolant designated "C", described above in Examples 1 to 4, diluted 50:50 with 20-gpg water. This composition was run through the recirculating test rig less than one day and a gel deposit was found coated on the interior of the reservoir. X-ray analysis of the dried gel showed it to contain: 40% silicon as $SiO_2$; 26% phosphorus as $P_2O_5$; 14% calcium as CaO; 14% sodium as $Na_2O$; and 5% magnesium as MgO.

This test was repeated adding to the coolant composition 120 ppm of hydroxyethylidene diphosphonate (Dequest 2010) and 1000 ppm actives Q1-6083, a phosphonated alkyl silane. No gel formed even after three days of running. To this coolant was then added sequentially three dosages of Nalcool 2000, each dose being about 3 volume percent based on total coolant. No gelling occurred despite the addition of this silicate-containing supplemental inhibitor.

EXAMPLE 19

Example 18 was repeated except that instead of a 50:50 dilution of coolant with 20-gpg water, a 70:30 coolant:20-gpg water composition was used. Again with three dosages of Nalcool 2000, each dose being about 3 volume percent based on total coolant, no gelling occurred in the recirculating test rig.

EXAMPLE 20

A series of coolant samples were prepared containing the commercial coolant designated herein as "C", diluted 50:50 with 20-gpg water to which were added a single manufacturer's recommended dosage of a commercial phosphate-containing silicate stabilizer. Without any further additives, this formulation was found to deposit more gel put through the recirculating rig test than the formulation without the silicate stabilizer. Thus this high-gel potential formulation was used to test the efficacy of the components of the stabilizer of the present invention alone.

First the formulation was tested in the recirculating rig test with the addition of 120 ppm of hydroxyethylidene diphosphonate (Dequest 2010). Gelling occurred overnight.

Then this formulation was tested in the same manner using no Dequest 2010 but 1000 ppm of Q1-6083, and again gelling occurred overnight. To determine whether this gelling might be merely related to the water hardness, this test was repeated using deionized water instead of 20-gpg water to dilute coolant C, and again gelling occurred overnight.

This formulation, with the 20-gpg water of dilution was again repeated using the combination of the Dequest 2010 and Q1-6083 at 120 ppm and 1000 ppm respectively and no gelling occurred in the recirculating rig test, even when the commercial phosphate-containing stabilizer was increased to three-times manufacturer's recommended dosage.

EXAMPLE 21

The recirculating rig test was used to determine the effectiveness of the stabilizer of the present invention in coolant formulations prepared with the commercial coolants designated "A", "B", and "D", described above, and a fourth commercial coolant, designated "E" that contains about one-fourth the silicate of coolants A, B, or C, together with a 3 volume percent dosage of Nalcool 2000 commercial supplemental conditioner. Each formulation gelled, although the gelling with coolant E was slight. When these formulations were retested with 120 ppm Dequest 2010 and 1000 ppm Q1-6083, no gelling occurred in any of these formulations even when two additional dosages of Nalcool 2000 were added.

EXAMPLE 22

The test described in Examples 1 to 4 above was repeated using coolant C and substituting for the 1-hydroxy-1,1-diphosphonate component of the stabilizer an aminotri(methylene phosohonic acid), Dequest 2000, at the same level of actives. No gelation occurred.

In the above Examples the "20-gpg water" is a hard water containing 20 grams per gallon calcium carbonate.

In the foregoing, all percentages are weight percentages unless specified otherwise.

Industrial Applicability of the Invention

The present invention is useful in the automotive industry and any other industry wherein aqueous coolants are utilized.

I claim:

1. A stabilizer for alkali metal silicate inhibited coolant compositions comprising, in combination:

(A) an organic phosphonate compound of the general formula

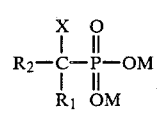

wherein X is H, amine, hydroxy, alkyl of 1 to 5 carbons, or aryl; $R_1$ is hydrogen, hydroxy, alkyl of 1 to 5 carbons, aryl, or a radical of the formula

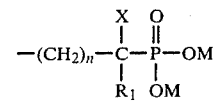

wherein n is an integer from 0 to 8; $R_2$ is hydrogen, alkyl of 1 to 5 carbons, aryl, or a radical of one of the formulas

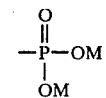

or

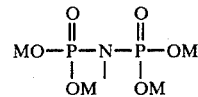

wherein any of said alkyl or aryl may be independently substituted with hydroxy, amine, halide, or alkoxy of 1 to 3 carbons; and wherein M is hydrogen or a water-soluble cation such as sodium, potassium, ammonium, and the like;

or an organic phosphonate compound of the general formula

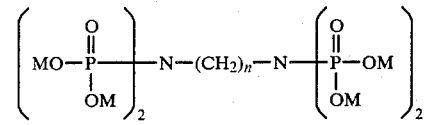

wherein n is an integer from 1 to 6 and M is as defined above;

or an organic phosphonate compound of the general formula

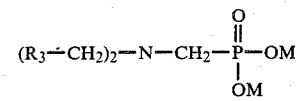

wherein M is as defined above and $R_3$ is a radical of one of the formulas

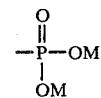

or

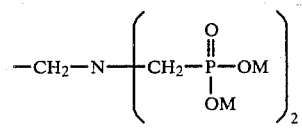

wherein M is as defined above; and (B) an organic silicon compound of the general formula

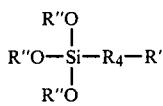

wherein R₄ is alkyl of 1 to 8 carbons, R' is a water-solubilizing group, and R'' is hydrogen, alkyl of 1 to 3 carbons, or a water-soluble cation such as sodium, potassium, ammonium, and the like, and wherein R₄ may be substituted with hydroxy, amine, halide or alkoxy of 1 to 3 carbons, wherein the proportions of said organic phosphonate compound to said organic silicon compound are selected to provide from 30 to 200 ppm of said organic phosphonate and from 250 to 2,000 ppm of said organic silicon when said stabilizer is added to an aqeuous coolant composition.

2. The stabilizer of claim 1, wherein said organic phosphonate compound is one in which R₂ is a radical of the formula

or

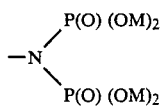

and M is as defined above in claim 1.

3. The stabilizer of claim 2 wherein said organic phosphonate compound is 1-hydroxyethylidene-1,1-diphosphonic acid.

4. The stabilizer of claim 1 wherein said organic phosphonate compound is of the formula

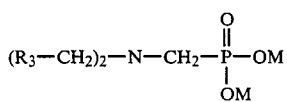

and R₃ is — P(O) (OM)₂.

5. The stabilizer of claim 1 wherein said organic silicon compound is one in which R' is a radical of the formula

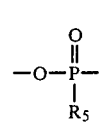

and R₅ is alkyl of 1 to 3 carbons.

6. the stabilizer of claim 5 wherein in said organic silicon compound R₄ is alkyl of 2 to 4 carbons and R'' is a water-soluble cation.

7. An aqueous coolant composition comprising:
from about 40 to about 70 weight percent of a glycol or glycol ether;
an effective amount of alkali metal silicate corrosion inhibitor; and
the stabilizer of claim 1, wherein the organic phosphonate of said stabilizer is present in an amount from 30 to 200 ppm based on total aqueous coolant composition; the organic silicon compound component of said stabilizer is present in an amount of from 250 to 2000 ppm based on total aqueous coolant composition.

8. The aqueous coolant composition of claim 7 wherein the organic phosphonate component of said stabilizer is as defined in claim 2.

9. The aqueous coolant composition of claim 8 wherein said organic phosphonate is as defined in claim 3.

10. The aqueous coolant composition of claim 7 wherein the organic silicon compound component of said stabilizer is as defined in claim 5.

11. The aqueous coolant composition of claim 7 wherein said organic phosphonate is as defined in claim 3 and said organic silicon compound is as defined in claim 5.

12. A method of stabilizing an alkali metal silicate inhibited glycol or glycol ether based aqeuous coolant composition comprising:
adding to an aqueous alkali metal silicate inhibited coolant formulation containing from about 40 to about 70 weight percent of a glycol or glycol ether an amount of a stabilizer as defined in claim 1, wherein the organic phosphonate of said stabilizer is present in an amount from 30 to 200 ppm based on total aqueous coolant composition; the organic silicon compound component of said stabilizer is present in an amount of from 250 to 2000 ppm based on total aqueous coolant composition.

13. A method of stabilizing an alkali metal silicate inhibited glycol or glycol ether based aqueous coolant compposition comprising:
adding to an alkali metal silicate inhibited glycol or glycol ether concentrate an effective amount of a stabilizer as defined in claim 1, wherein the organic phosphonate of said stabilizer is present in an amount from 30 to 200 ppm based on total aqueous coolant composition; the organic silicon compound of said stabilizer is present in an amount of from 250 to 2000 ppm based on total aqueous coolant composition.

* * * * *